United States Patent
Rohanna et al.

(10) Patent No.: US 10,428,163 B2
(45) Date of Patent: Oct. 1, 2019

(54) SULFONATION PROCESS

(71) Applicant: Rohm and Haas Company, Collegeville, PA (US)

(72) Inventors: John C. Rohanna, Royersford, PA (US); Alfred K. Schultz, Maple Glen, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 114 days.

(21) Appl. No.: 15/562,047

(22) PCT Filed: Mar. 28, 2016

(86) PCT No.: PCT/US2016/024489
§ 371 (c)(1),
(2) Date: Sep. 27, 2017

(87) PCT Pub. No.: WO2016/160686
PCT Pub. Date: Oct. 6, 2016

(65) Prior Publication Data
US 2018/0086863 A1 Mar. 29, 2018

Related U.S. Application Data

(60) Provisional application No. 62/140,779, filed on Mar. 31, 2015.

(51) Int. Cl.
C08F 8/36 (2006.01)
C01B 17/90 (2006.01)
C08K 3/04 (2006.01)
C08L 33/20 (2006.01)

(52) U.S. Cl.
CPC ............ *C08F 8/36* (2013.01); *C01B 17/905* (2013.01); *C08K 3/04* (2013.01); *C08L 33/20* (2013.01)

(58) Field of Classification Search
CPC .. C08F 8/36; C08K 3/04; C08K 3/041; C08K 3/042; C08K 3/043; C08K 3/044; C08K 3/045; C08K 3/046
See application file for complete search history.

(56) References Cited

U.S. PATENT DOCUMENTS

| | | | | |
|---|---|---|---|---|
| 1,898,688 A | | 2/1933 | Rose | |
| 3,056,765 A | * | 10/1962 | Cowherd | C08F 8/36 525/333.5 |
| 6,300,466 B1 | * | 10/2001 | Heschel | C01B 32/336 528/481 |
| 7,101,526 B2 | * | 9/2006 | Paparatto | B01J 21/18 423/584 |
| 2013/0240438 A1 | * | 9/2013 | Willis | C08F 8/36 210/500.41 |

FOREIGN PATENT DOCUMENTS

| | | |
|---|---|---|
| CN | 102174212 A | 9/2011 |
| GB | 935877 A | 9/1963 |
| GB | 1284249 A | 8/1972 |

OTHER PUBLICATIONS

CABOT, "Activated Carbons and What They Can Do for You", CABOT Norit Activated Carbon, Chemicals, pp. 1-12, cabotcorp.com (2013).

"Studies of the Application and Removal of Powdered Activated Carbon at the City of Chicago Water Department's Jardine and South Water Purification Plants", City of Chicago Water Department, pp. 1-6, http://www.h2oc/pdfs/Chicago.pdf (1996).

Yacob, et al., "Comparison of Various Sources of High Surface Area Carbon Prepared by Different Types of Activation", The Maylaysian Journal of Analytical Sciences, vol. 12, No. 1, pp. 264-271 (2008).

Tsai, et al., "Characterization and adsorption properties of diatomaceous earth modified by hydrofluoric acid etching", J. Colloid and Interface Science, vol. 297, pp. 749-754 (2006).

* cited by examiner

*Primary Examiner* — Robert C Boyle

(57) ABSTRACT

Provided is a method for reacting a resin with sulfuric acid comprising the step of heating a reaction mixture to a temperature of 80° C. or higher, wherein said reaction mixture comprises
(a) a collection of copolymer particles (A),
(b) sulfuric acid, and
(c) a collection of solid particles (B) different from said copolymer particles (A), wherein said solid particles (B) have BET surface area of 50 $m^2/g$ to 5,000 $m^2/g$.

2 Claims, No Drawings

SULFONATION PROCESS

It is often desired to react a copolymer with sulfuric acid to create a resin. A common method for conducting such a reaction is to form a mixture that contains the copolymer and sulfuric acid, to heat the mixture for a time to produce a resin with sulfonic functionality, and then separate the resin from the sulfuric acid. In some cases, after resin has been reacted by such a method, when water is brought into contact with the resin, the water becomes colored, and it is assumed that one or more colored compounds has transferred from the resin to the water. The color in the water that results from such a transfer process is known as the "color throw" of the resin, and high amount of color throw is considered undesirable.

The publication "Activated Carbons and What They Can Do For You," by the Cabot Corporation, states that activated carbon is often used to remove residual color. It is desired to identify a process for reacting copolymer with sulfuric acid that produces resin that has reduced color throw.

The following is a statement of the invention.

An aspect of the present invention is a method for reacting a copolymer with sulfuric acid comprising the step of heating a reaction mixture to a temperature of 80° C. or higher, wherein said reaction mixture comprises
(a) a collection of copolymer particles (A),
(b) sulfuric acid, and
(c) a collection of solid particles (B) different from said copolymer particles (A), wherein said solid particles (B) have BET surface area of 50 m$^2$/g to 5,000 m$^2$/g.

The following is a detailed description of the invention.

As used herein, the following terms have the designated definitions, unless the context clearly indicates otherwise.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have the structure

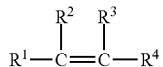

where each of R$^1$, R$^2$, R$^3$, and R$^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. Acrylic monomers are monomers selected from (meth)acrylonitrile, (meth)acrylic acid, alkyl esters of (meth)acrylic acid, amides of (meth) acrylic acid, vinyl chloride, halogenated alkenes, and mixtures thereof. As used herein, the prefix "(meth)acryl-" means either acryl- or methacryl-. "Substituted" means having at least one attached chemical group such as, for example, alkyl group, alkenyl group, vinyl group, hydroxyl group, alkoxy group, carboxylic acid group, other functional groups, and combinations thereof.

As used herein, vinyl aromatic monomers are vinyl monomers in which one or more of R$^1$, R$^2$, R$^3$, and R$^4$ contains one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A polymer in which 90 mole % or more of the polymerized units are polymerized units of one or more vinyl monomer is a vinyl polymer.

A collection of particles is characterized by the diameters of the particles. If particle is not spherical, the diameter of the particle is considered to be the diameter of a particle having the same volume as the particle. A collection of particles is characterized herein by the volume-average diameter of the collection. A particle is considered solid herein if the particle is in the solid state over a temperature range that includes 0° C. to 80° C. The surface area of a collection of solid particles is determined by the Brunauer-Emmett-Teller (BET) method.

As used herein oleum is a mixture that contains sulfuric acid. Oleum is made by mixing sulfuric acid with sulfur trioxide. It is assumed that sulfuric acid reacts with sulfur trioxide to form pyrosulfuric acid (H$_2$S$_2$O$_7$). It is considered that if water were added to oleum, each mole of water would react with one mole of pyrosulfuric acid to form two moles of sulfuric acid. The "concentration" of a sample of oleum is taken to be the weight of sulfuric acid that would be present if sufficient water were added to the sample of oleum to convert all of the pyrosulfuric acid to sulfuric acid, as a percentage based on the weight of the sample of oleum. By this definition, the "concentration" of oleum can be greater than 100%. Another way to characterize oleum is the parameter "% oleum," which considers that each sample of oleum can be characterized as a reaction product of X grams of sulfuric acid and Y grams of sulfur trioxide. The parameters X and Y are uniquely determined by the composition of the sample of oleum. Then "% oleum" is 100*Y/(X+Y). When it is stated herein that as sample of sulfuric acid is used in which the concentration of sulfuric acid is "C % or higher," it is meant that the sample is either (1) a mixture of sulfuric acid in water in which the weight concentration of sulfuric acid is C % to 100% or (2) oleum.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The present invention involves the use of a copolymer (A). Preferred copolymers for copolymer (A) are vinyl polymers. Among vinyl polymers, preferred are two types of vinyl polymers, herein labeled "AN polymers" and "vinyl aromatic polymers."

AN polymers are vinyl polymers that contain polymerized units of acrylonitrile or methacrylonitrile or a combination thereof. Preferred AN polymers have no polymerized units of any vinyl aromatic monomer. Among AN polymers, preferably the amount of polymerized units of acrylonitrile and methacrylonitrile is, by weight based on the weight of the AN polymer, 50% or more; more preferably 75% or more; more preferably 95% or more. Among AN polymers, most preferred is poly(acrylonitrile) homopolymer.

Vinyl aromatic polymers are preferred. Among vinyl aromatic polymers, preferably the amount of polymerized units of vinyl aromatic monomer, by weight based on the weight of the copolymer (A), is 50% or more, more preferably 75% or more; more preferably 85% or more; more preferably 95% or more; more preferably 99% or more. Preferred vinyl aromatic monomers are styrene, alkyl styrenes, alpha-alkyl styrenes, and divinyl benzene; more preferred are styrene and divinyl benzene. Among vinyl aromatic polymers, preferably the amount of polymerized units of styrene plus the amount of polymerized units of divinyl benzene is, by weight based on the weight of the copolymer (A), is 40% or more, more preferably 65% or more; more preferably 75% or more; more preferably 80% or more. Preferably, the amount of polymerized units of divinyl benzene, by weight based on the weight of the copolymer, is 10% or more; more preferably 20% or more.

Preferred vinyl polymers have polymerized units of one or more multivinyl monomer. Preferably, the amount of polymerized units of multivinyl monomer, by weight based on the weight of the vinyl polymer, is 0.5% or more; more preferably 1% or more; more preferably 2% or more. Preferably, the amount of polymerized units of multivinyl monomer, by weight based on the weight of the vinyl polymer, is 100% or less.

While the present invention is not limited to any specific theory, it is contemplated that when an AN polymer reacts with water that contains sulfuric acid, some or all of the nitrile groups are converted to carboxyl groups. It is further contemplated that when a vinyl aromatic polymer reacts with sulfuric acid, on some or all of the aromatic rings, one or more —SO$_3$ group replaces a hydrogen atom attached to a carbon atom within the aromatic ring.

The copolymer (A) is in the form of a collection of particles (A). Preferably, the volume average particle size is 50 µm or greater; more preferably 100 µm or greater; more preferably 300 µm or greater. Preferably, the volume average particle size is 2 mm or smaller; more preferably 1 mm or smaller.

The present invention involves the use of sulfuric acid. When copolymer (A) is a vinyl aromatic polymer, the following preferences for sulfuric acid apply. When a solution of water and sulfuric acid is used, preferably the concentration of sulfuric acid, by weight based on the weight of the solution of sulfuric acid in water, is 92% or more; more preferably 95% or more. Preferably, the sulfuric acid is present in the form of oleum. Preferably the concentration of the oleum is 100% or more by weight, more preferably 103% or more by weight. Preferably, the % oleum is 5% or more; more preferably 10% or more; more preferably 15% or more.

When copolymer (A) is a vinyl aromatic polymer, preferably, the copolymer (A), prior to contact with sulfuric acid, contains relatively little water. Preferably, the weight ratio of water to dry copolymer (A) is 0.25:1 or less; more preferably 0.11:1 or less.

When copolymer (A) is an AN polymer, the following preferences for sulfuric acid apply. Preferably, sulfuric acid is in the form of a solution of sulfuric acid in water. Preferably, the concentration of sulfuric acid is, by weight based on the weight of the solution of sulfuric acid in water, 20% or higher; more preferably 40% or higher; more preferably 50% or higher. Preferably, the concentration of sulfuric acid is, by weight based on the weight of the solution of sulfuric acid in water, 90% or lower; more preferably 80% or lower.

The present invention involves the use solid particles (B) having surface area by the BET method of 50 m$^2$/g to 5,000 m$^2$/g. Preferably, particles (B) have surface area of 100 or more m$^2$/g; more preferably 200 or more m$^2$/g, more preferably 500 or more m$^2$/g, more preferably 800 or more m$^2$/g. Preferably, particles (B) have surface area of 2,500 m$^2$/g or less.

Preferably, the volume average particle diameter of the solid particles (B) is 200 µm or less; more preferably 100 µm or less; more preferably 50 µm or less; more preferably 20 µm or less. Preferably, the volume average particle diameter of the solid particles (B) is 0.01 µm or greater; more preferable 0.02 µm or greater.

Preferred solid particles (B) are resin particles or activated carbon particles or a mixture thereof. When solid particles (B) are resin particles, preferably the resin particles are selected from high-DVB resins, post-crosslinked resins, and pyrolized resins. High-DVB resins have polymerized units of divinyl benzene (DVB) in the amount of, by weight based on the weight of the high-DVB resin, 50% or more; more preferably 60% or more; more preferably 70% or more; more preferably 80% or more. Post-crosslinked resins are produced by copolymerization of monomers including styrene and DVB; the resulting copolymer is then subjected to a crosslinking reaction, preferably by a Friedel-Crafts reaction to create methylene bridge crosslinks. Pyrolized resins are produced by copolymerization of monomers including styrene and DVB; the resulting copolymer is contacted with sulfuric acid to add sulfonate groups to the copolymer to form a sulfonated resin; and the sulfonated resin is then pyrolized. Resin particles are preferably made by suspension polymerization. Optionally, after suspension polymerization, resin particles may be subjected to a mechanical process such as grinding to reduce the volume-average particle diameter.

Preferably, solid particles (B) are particles of activated carbon. Preferred is powdered activated carbon.

If the sulfuric acid is not present in the form of oleum, preferably the weight ratio of sulfuric acid to copolymer (A) is 5:1 or higher; more preferably 10:1 or higher; more preferably 20:1 or higher. If the sulfuric acid is not present in the form of oleum, preferably the weight ratio of sulfuric acid to copolymer (A) is 200:1 or lower; more preferably 100:1 or lower. If the sulfuric acid is present in the form of oleum, preferably, the weight ratio of oleum to copolymer (A) is 5:1 or higher; more preferably 10:1 or higher; more preferably 20:1 or higher. If the sulfuric acid is present in the form of oleum, preferably, the weight ratio of oleum to copolymer (A) is 200:1 or lower; more preferably 100:1 or lower.

Preferably, the weight ratio of solid particles (B) to copolymer (A) is 0.01:1 or higher; more preferably 0.03:1 or higher; more preferably 0.09:1 or higher. Preferably, the weight ratio of solid particles (B) to copolymer (A) is 3:1 or lower; more preferably 2:1 or lower; more preferably 1:1 or lower.

The process of the present invention includes a step in which a reaction mixture of the copolymer (A), sulfuric acid, and the solid particles (B) is heated to a holding temperature for a duration of time. When the copolymer (A) is a vinyl polymer, preferably the holding temperature is 100° C. or higher; more preferably 110° C. or higher; more preferably 120° C. or higher. When the copolymer (A) is a vinyl polymer, preferably, the maximum temperature reached in the process of the present invention is 250° C. or lower; more preferably 200° C. or lower. Preferably, the holding temperature is maintained for a duration of 1 hour or more; more preferably 2 hours or more; more preferably 3 hours or more. Preferably, the holding temperature is maintained for a duration of 24 hours or less; more preferably 18 hours or less.

When the copolymer (A) is an AN polymer, the holding temperature is preferably 80° C. or higher; more preferably 90° C. or higher. When the copolymer (A) is an AN polymer, the holding temperature is preferably less than 100° C.

Preferably, while the reaction mixture is heated, it is also stirred. Preferably the stirring is sufficient to provide thorough intimate contact among the resin particles, sulfuric acid, and solid particles (B) particles. Preferably the stirring is sufficient to create a vortex in the reaction mixture.

After the reaction mixture has been heated to a holding temperature for time, the reaction between the sulfuric acid and the resin is considered to be complete or as complete as desired, and that time is considered the termination time. Preferably, after termination time is reached, the reaction mixture is cooled to a temperature below 100° C. Preferably, after the termination time is reached, relatively dilute sulfuric acid is added to the reaction mixture. The "relatively dilute sulfuric acid" is a solution of sulfuric acid in water that has lower weight ratio of sulfuric acid to water than the weight ratio of sulfuric acid to water that is found in the reaction mixture at the termination time. Preferably, after dilute sulfuric acid is added, water is added. It is contemplated that cooling the reaction mixture, adding relatively dilute sulfuric acid, and adding water all serve to quench the reaction between resin and sulfuric acid.

Preferably, after the reaction between the sulfuric acid and the copolymer (A) has been conducted, the resulting resin is separated from the sulfuric acid, from the solid particles (B), and from some or all of the water that may be present. Preferably, the polymer particles of the resin are larger than the particles of solid particles (B). A preferred method of separating the resin is to pass the reaction mixture through a filtration medium that passes liquid and passes solid particles (B) but does not pass polymer particles of resin. One preferred filtration medium is a mesh screen with openings chosen to retain 90 volume percent or more of the polymer particles of resin and to pass 90 volume percent or more of the particles of solid particles (B).

Preferably, after separating the resin from the sulfuric acid and the solid particles (B), the resin is then washed with water. A preferred method of washing is chromatographic washing, in which resin is placed in a chromatographic column, and water is passed through the column.

Preferably, the presence or absence of solid particles (B) during the reaction process does not substantially affect the final properties of the resin, measured after the reaction process and quenching and washing. For example, the water retention and the H-form cation-exchange capacity preferably do not change substantially. The water retention and the H-form cation-exchange capacity is measured by ASTM D2187-94, methods B and G, respectively.

While the present invention is not limited to any specific theory, it is contemplated that color throw in the resin is caused by the presence of color-causing molecules. It is contemplated that the color-causing molecules transfer from the resin to the solid particles (B).

The following are examples of the present invention.

Resin1 was a copolymer of styrene and divinyl benzene (DVB), made by suspension polymerization using standard techniques. DVB was used as supplied, in the form of a commercial DVB mixture containing 85% pure DVB by weight and 15% impurities by weight. The principal impurity is ethylvinyl benzene. Monomers used for making Resin1 were, in parts by weight, 81.2 parts styrene, 16 parts DVB, and 2.8 parts of the impurities carried by the commercial DVB mixture.

Sulfuric acid was in the form of oleum, with 20% oleum.

The activated carbon was NORIT™ powdered activated carbon from Cabot Corporation.

EXAMPLE 1: WITH AND WITHOUT ACTIVATED CARBON

In each reaction mixture, 10 g of Resin1 was mixed with 150 mL of oleum. Activated carbon was added to some of the reaction mixtures as shown below. Reaction mixtures were heated to 125° C. and held at 125° C. for 6 hours with vigorous stirring. Resulting mixtures were then cooled to below room temperature, and then, while stirring was maintained, dilute sulfuric acid was added, followed by deionized water. Then the resin was decanted, and then the resin was chromatographically washed with 500 ml of water. The resin was mixed with 50 mL of deionized water and allowed to stand for 30 days at approximately 22° C. Then 5 mL of the water was removed and placed into a cuvette of 1 cm path length, which was placed in a UV-VIS spectrophotometer, and the absorbance was measured at wavelength of 420 nm.

Results were as follows:

| Example | Activated Carbon (g) | Absorbance | Water Retention (%) | Capacity[2] (meq/g) |
|---|---|---|---|---|
| 1-C[1] | 0 | 0.563 | 50.5 | 4.97 |
| 2 | 1 | 0.409 | 50.8 | 5.00 |
| 3 | 2 | 0.233 | 50.8 | 5.03 |

[1]Example 1-C is a comparative example.
[2]H-form cation-exchange capacity

The use of activated carbon significantly reduced the color throw of the resin, as shown by the low absorbance numbers. The water retention and the capacity of the resins was not significantly changed by the use of the activated carbon.

The invention claimed is:
1. A method for reacting a resin with sulfuric acid comprising the step of heating a reaction mixture to a temperature of 80° C. or higher, wherein said reaction mixture comprises
    (a) a collection of copolymer particles (A),
    (b) sulfuric acid, and
    (c) a collection of solid particles (B) different from said copolymer particles (A), wherein said solid particles (B) have BET surface area of 50 $m^2/g$ to 5,000 $m^2/g$, wherein said solid particles (B) comprise activated carbon particles.
2. The method of claim 1, wherein said activated carbon particles are powdered carbon particles.

* * * * *